Nov. 30, 1937.   W. J. KERSENBROCK   2,100,763
TROTLINE RACK
Filed Oct. 7, 1935
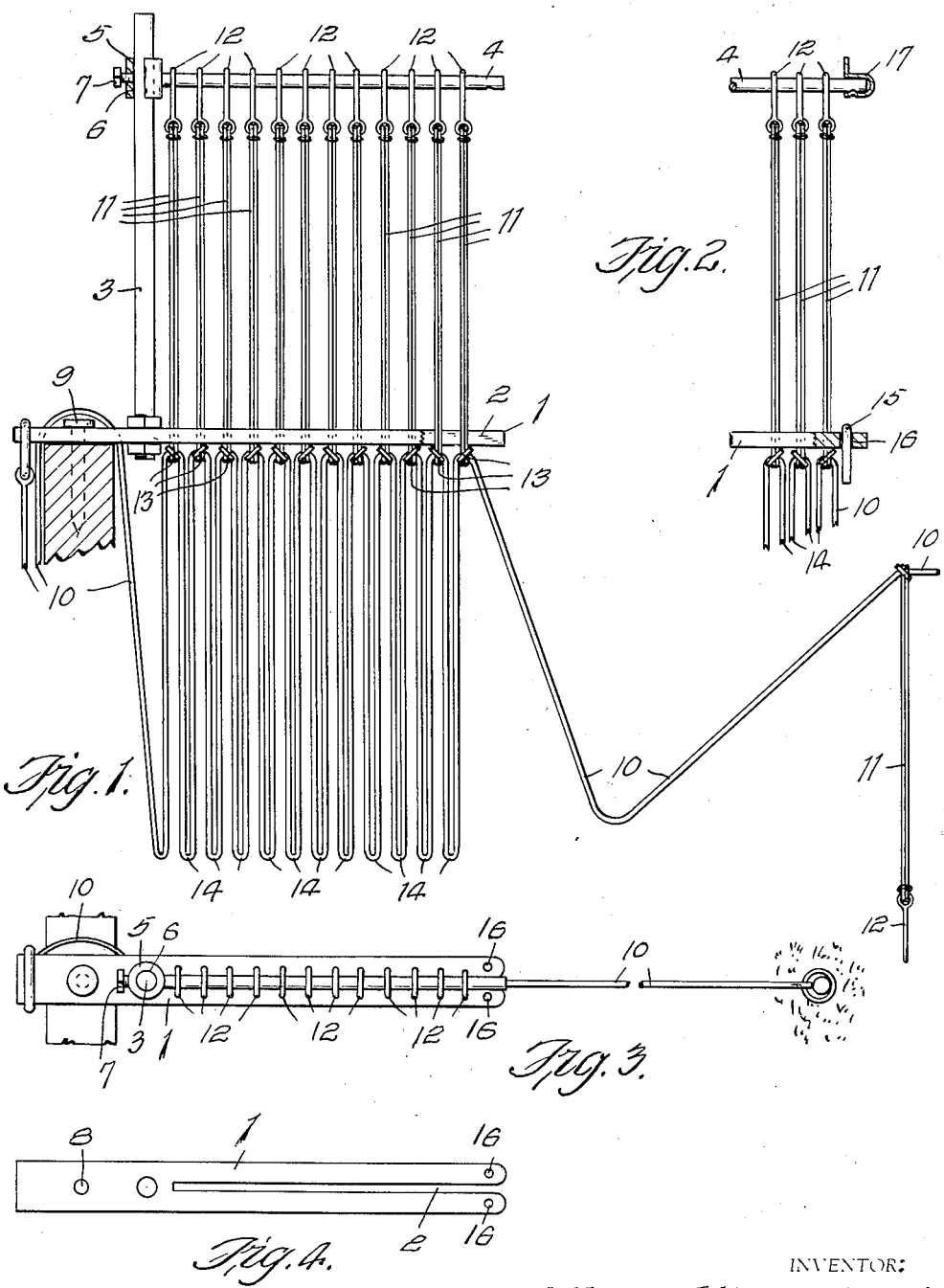
INVENTOR:
William J. Kersenbrock.
BY
Fred J. Larson
ATTORNEY.

Patented Nov. 30, 1937

2,100,763

UNITED STATES PATENT OFFICE 2,100,763

TROTLINE RACK

William J. Kersenbrock, Brentwood, Mo.

Application October 7, 1935, Serial No. 43,873

9 Claims. (Cl. 43—31)

My invention relates to a trot-line rack and method of using same.

An object of my invention is to provide a portable rack of the above character, which is simple, inexpensive and durable in construction.

Another object of the invention is the provision of a rack whereby the handling of a trotline will be safe.

Another object of the invention is the provision of a rack whereby a trot-line can be quickly and progressively positioned on the rack and progressively dispensed therefrom at any speed when setting or laying the line.

Another object of the invention is the provision of a rack which is adjustable relative to the length of the branch lines of a trot-line.

A further object of the invention is the provision of a rack that will prevent a trot-line from becoming tangled in itself when supported thereby and dispensed therefrom, and during transportation and handling thereof when racked.

A further object of the invention is the provision of a trot-line rack that will permit easy baiting of the fishhooks when assembled thereon.

A further object of the invention is the provision of a trot-line rack that permits of proper drying of the trot-line when assembled thereon.

A further object of the invention is the provision of a trot-line rack, or holder, which from an economic standpoint, when used, results in a saving of time when racking and dispensing the line, prolongs the life of the line, and saves in the loss of fishhooks.

An essential feature of the invention is the ease, rapidity or speed in which a trot-line can be set, or laid by dispensing same from the rack.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views:

Fig. 1 is a side elevation with parts in section, of a trot-line rack embodying the features of my invention and showing a trot-line gathered on the rack and being dispensed therefrom.

Fig. 2 is a detail of one end of the trot-line rack showing stop members applied.

Fig. 3 is a top plan view of the device with a trot-line gathered thereon and being dispensed therefrom.

Fig. 4 is a top plan view of the slotted branch line guide member.

Referring to the drawing, the reference character 1 designates a suitable guide member, which member can be made from any suitable material, and, it may be made of any size or shape for association with any desired length of trot-line. The guide member 1 is provided with a suitable narrow longitudinal slot 2, which slot is open at one end, and, the edges of the slot are not to be sharp so as to prevent cutting of the branch lines of a trot-line, or in any other way damaging same when racking trot-line or dispensing same from its supporting rack.

A suitable upright or standard 3 is shown, in one embodiment of the invention, as suitably associated with and projecting upwardly from one end of slotted guide member 1.

A suitable fishhook supporting member 4 is disposed a suitable distance above the slotted guide member 1 and it is associated therewith in parallel relation. In one embodiment of the invention, as shown, the fishhook supporting member 4, which may be in the form of a suitable rod, is adjustably supported at one end on the upright 3. It is supported in such a fashion that it may be raised and lowered with relation to the guide member 1. By this arrangement, the rack will accommodate various lengths of branch lines leading from the main line.

As illustrated, the rod 4 is provided with a suitable head 5 having an opening 6 through which the upright 3 passes, and the head 5 is secured against displacement on the upright 3 by means of a suitable fastening device 7.

One end of the guide member 1 is shown, in one embodiment thereof, as being merely provided with an opening 8 through which a suitable fastening device 9 may pass for securing the rack in position on a boat, if so desired, for the purpose of setting or laying a baited trot-line racked and supported by the rack described. If desired, the rack may be held in the hands of a person in a boat if it is not desired to secure the rack in position on a boat.

In the drawing, I have illustrated a small section of a trot-line and the main line thereof is designated 10, the spaced branch lines thereof 11, the fishhooks 12 which are carried by the branch lines 11, and the connections 13 of the branch lines with the main line 10.

Having thus described one embodiment of the trot-line rack and a trot-line, I shall now proceed to describe the method of racking the trot-line and supporting it in position on the rack and the method employed in dispensing the line therefrom when setting or laying the trot-line in water.

To assemble the trot-line on the rack, the operator takes the first branch line 11 on the main line 10 and inserts it into the slot 2 in the guide member 1 by entering it from the open end of the slot 2. It may be done by holding the fishhook 12 thereon in one hand and the branch line 11 in the other hand. When the selected branch line 11 is so positioned in the slot, the fishhook 12 thereon is hooked over the fishhook supporting rod 4 and the branch line 11 is moved to its closest position adjacent the upright 3. After this has been accomplished, the operator takes the next branch line 11 and positions it in the slot of the guide member, places the fishhook 12 thereon over the fishhook supporting member 4 and moves the branch line 11 to a position next to the first racked branch line. This operation is repeated until all of the branch lines of the trot-line are in aligned position in a straight row on the rack. It will be observed that the main line between each pair of branch lines lies in a vertical suspended fold 14 below the slotted guide member 1 and that each branch line 11 is extended and straightened out between the guide member 1 and the fishhook supporting member 4. It will be understood that the connections 13 uniting each branch line 11 with the main line 10, are usually in the form of a knot and the knots are adapted to be disposed below the slot 2 in the guide member 1 and serves to prevent the main line being pulled into the slot. Thus, the main line folds 14 are spaced apart below the guide member 1 in alignment, and the branch lines 11 are all straightened out and spaced apart in alignment. By this arrangement, there is no chance of either the main line folds 14 of the extended branch lines 11 becoming tangled during transportation, or handling of the racked trot-line. In its racked position, the trot-line is always ready to be baited with ease, by merely lifting each fishhook 12 sufficiently from the rod 4 for baiting same, which is possible due to the stretch in the branch lines 11. The fishhooks may be baited anywhere, even in a house.

After the fishhooks 12 on the racked trot-line have been baited, the method of dispensing, setting or laying the line directly from the rack secured to a boat, or otherwise supported, consists in suitably anchoring the outer end of the trot-line to a peg driven into a river or lake bank, as well known and not shown, or by anchoring the free end in water by other suitable and well known means such, as by a weight and a float. If the trot-line rack has been previously secured to the end of a boat, before anchoring the free end thereof, everything is all ready for setting or laying the trot-line in the water. In starting movement of the boat away from the anchored end of the trot-line, the main line becomes tensioned between the anchored end thereof and its connection with the last branch line 11 positioned in the slot 2 in the guide member 1, and when the lower end of said branch line 11 is pulled out of the slot 2 and the fishhook 12 thereon which is hooked over supporting member 4 slides off the free end thereof in following the branch line 11 and the first fold 14 in the main line below the guide member 1 is extended, then the next branch line 11 and hook therefor is removed or dispensed from the rack in the same fashion as the first to leave, the second main line fold 14 straightens out and as the boat moves forward the entire racked line is progressively dispensed from the rack at any rate of speed desired, without any possible chance of the main line becoming tangled, the branch lines becoming tangled, or the hooks becoming tangled.

The branch lines 11 are, of course, spaced along the main line 10 such distance apart as to be greater than the combined length of two branch lines 11 and their hooks 12 when positioned toward each other parallel with the main line 10.

The end of the trot-line opposite the anchor may be suitably secured to the trot-line rack, if desired, secured to the boat, or held in the hand, and it may be anchored to an opposite shore, or otherwise when the trot-line has been set or laid in the water.

A suitable stop member 15 in the form of a suitable staple, or an equivalent device, can be employed to span the slot 2 at the open end thereof, and it is suitably and detachably applied to the free end of the guide member 1, and, in the embodiment shown, the legs of the staple 15 pass through openings 16 in the guide member 1.

A suitable stop member 17 in the form of a suitable flanged cap, or an equivalent device, can be employed for detachable application to the free end of the fishhook supporting member 4 to prevent adjacent fishhooks thereon from accidentally slipping off the end of the member 4 during handling or transportation, or handling of the rack when a trot-line is assembled thereon.

From the foregoing description, it is evident that I provide a trot-line rack, in one embodiment thereof, which will permit the uniform and progressive racking of a trot-line, at the factory, if desired, for shipment in package form, which will permit of easy and quick racking of the line by fishermen, permitting of easy and quick baiting of the fishhooks when the line is racked, permit of quick drying of the line when racked, and afford simple means whereby the trot-line can be set or laid from a boat at any desired speed without any chances of the line becoming tangled in so doing.

While I have stated and illustrated that the trot-line may be secured to a boat, when setting or laying the trot-line in water, it is obvious that the means shown for securing the rack to a boat may be other than that shown, for instance, an equivalent fastening device, such as a clamping device, and, also that the trot-line may be thrown into the water by anchoring the rack on land, a post or other device, or holding it in the hand of the party throwing the line, or in the hand of a second party.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. A trot-line rack comprising a branch line guide member having a slot open at one end, a fishhook supporting member, and a connection between one end of said members for holding the said members in desired spaced relation relative to each other.

2. A trot-line rack comprising a branch line guide member, a fishhook supporting member, and a connection between said members for supporting the fishhook supporting member in parallel spaced relation with the branch line guide member.

3. A trot-line rack comprising a branch line guide member having a longitudinal slot open at one end, an upright secured at its lower end to one end of the slotted guide member, a fishhook supporting member adjustably mounted at one end on said upright, and means for locking the fishhook supporting member in any desired spaced parallel relation relative to the slotted guide member.

4. A trot-line rack comprising a guide member having a longitudinal slot open at one end adapted to receive, in succession, branch lines adjacent their connections with the main line so that the main line will lie in suspended folds below the guide member, an upright member secured to the guide member, a member carried by the upright member in desired spaced parallel relation relative to the guide member and adapted to serve as a support for fishhooks carried by the free ends of the branch lines to hold the branch lines extended in side by side relation between the guide member and the fishhook supporting member.

5. A trot-line rack comprising a slotted guide member for the ends of branch lines adjacent their connections with a main line whereby the main line can be suspended in a series of vertical folds below the guide member, a fishhook supporting member spaced from and overlying the slot in the guide member and to which fishhooks on the ends of the branch lines are adapted to be connected to straighten out the branch lines between the slotted guide member and the fishhook supporting member.

6. A racking device for trot-lines comprising a slotted guide member adapted to receive branch lines leading from the main line of the trot-line, a supporting member overlying and spaced from said guide member over which fishhooks on the branch lines are hooked, and a connection between one end of the guide member and one end of the fishhook supporting member upon which the supporting member is vertically adjustable.

7. A racking device for trot-lines comprising a guide member having a slot provided with an open end, a fishhook supporting member and a connection between said members for holding them in spaced parallel relation, said slot adapted to receive the inner ends of the branch lines of a trot-line in side by side relation, fishhooks on the ends of the branch lines adapted to be hooked in side by side relation on the fishhook supporting member for holding the branch lines in straightened out positions between the two members and the branch line connections with the main line adapted to be disposed below the slotted guide member to effect a depending fold in the main line of the trot-line between each branch line connection therewith.

8. A rack for baited and unbaited trot-lines comprising a guide member having a slot open at one end, a vertically adjustable fishhook supporting member overlying the slot in the guide member, and means for holding said members in any desired spaced relation relative to each other.

9. In a device of the class described, means from which the branch lines of a trot-line are suspended in a straight row, means for guiding inner ends of the branch lines adjacent their connections with a main line and with the connections disposed below the guiding means so that the main line between each pair of branch lines will lie in a vertical fold below the branch line guiding means, a connection between the guiding means and the means from which the branch lines are suspended and the trot-line adapted to be gathered upon the device from one end thereof and dispensed from the same end thereof.

WILLIAM J. KERSENBROCK.